(12) United States Patent
Kim et al.

(10) Patent No.: US 7,495,725 B2
(45) Date of Patent: Feb. 24, 2009

(54) TRANSFLECTIVE LIQUID CRYSTAL DISPLAY DEVICE AND FABRICATION METHOD THEREOF

(75) Inventors: Kyeong Jin Kim, Gyeonggi-do (KR); Mi Kyoung Jang, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 501 days.

(21) Appl. No.: 11/023,342

(22) Filed: Dec. 29, 2004

(65) Prior Publication Data

US 2005/0140878 A1  Jun. 30, 2005

(30) Foreign Application Priority Data

Dec. 30, 2003  (KR) .............. 10-2003-0100693

(51) Int. Cl.
*G02F 1/1335* (2006.01)
(52) U.S. Cl. .............. 349/114; 349/113; 349/106
(58) Field of Classification Search ........... 349/106, 349/114, 113
See application file for complete search history.

(56) References Cited

U.S. PATENT DOCUMENTS

| | | | | |
|---|---|---|---|---|
| 6,324,011 | B1* | 11/2001 | Higuchi | 359/627 |
| 2002/0167624 | A1* | 11/2002 | Paolini et al. | 349/61 |
| 2003/0137625 | A1* | 7/2003 | Okazaki et al. | 349/113 |
| 2004/0141108 | A1* | 7/2004 | Tanaka et al. | 349/96 |
| 2005/0140873 | A1* | 6/2005 | Hong | 349/114 |

* cited by examiner

*Primary Examiner*—Julie Ngo
(74) *Attorney, Agent, or Firm*—Birch, Stewart, Kolasch & Birch, LLP

(57) ABSTRACT

A transflective LCD includes an upper substrate having a common electrode formed therein; a lower substrate spaced apart by a predetermined interval from the upper substrate and facing the upper substrate, the lower substrate having a pixel region including a switching region, a reflection part, and a transmission part, and including a delta film, a thin film transistor layer, a color filter layer and a reflector formed therein; a liquid crystal layer interposed between the upper substrate and the lower substrate; and a backlight assembly disposed below the lower substrate, for supplying light toward the lower substrate.

11 Claims, 13 Drawing Sheets

TRANSFLECTIVE LIQUID CRYSTAL DISPLAY DEVICE AND FABRICATION METHOD THEREOF

This application claims the priority benefit of Patent Application No. 10-2003-0100693 filed on Dec. 30, 2003 in Republic of Korea, which is hereby incorporated by reference.

BACKGROUND OF THE INVENTION

1. Field of the Invention

The present invention relates to a transflective liquid crystal display device and fabrication method thereof, and more particularly, to a transflective liquid crystal display device having a COT structure in which a delta film functioning as light induction material is formed on a lower substrate, and to a fabrication method thereof.

2. Description of the Related Art

Generally, a liquid crystal display device (LCD) is a flat display having advantages such as lightweight, slim profile, and low power consumption, and is widely used for portable computers such as notebook computers, office automation machines, audio/video apparatuses and the like.

The LCD controls an electric field applied to a liquid crystal material having dielectric anisotropy to transmit or shield light, thereby displaying an image. Unlike electro-luminescence (EL), cathode ray tube (CRT), light emitting diode (LED) and the like, the LCD does not generate light by itself, but uses ambient light or a backlight assembly for generating light.

Generally, the LCDs can be classified into two different categories: transmission type and reflection type depending on the usage method of light.

The transmission type LCD includes an LCD panel and a backlight, where the LCD panel has two glass substrates, and a liquid crystal layer interposed therebetween.

FIG. 1 is a cross-sectional view schematically showing a structure of the transmission type LCD according to the related art.

Referring to FIG. 1, the transmission type LCD includes: a lower substrate 102; an upper substrate 101 which faces the lower substrate 102; a liquid crystal layer 103 including liquid crystal molecules interposed between the upper and the lower substrates 101 and 102; a first polarizing plate 105 disposed on an outer surface of the lower substrate 102; a second polarizing plate 104 disposed on an outer surface of the upper substrate 101; and a backlight assembly 106 generating light to supply light.

The lower substrate 102 includes a base substrate, a plurality of gate lines and data lines arranged in a matrix configuration on the base substrate, and a plurality of thin film transistors (TFTs) disposed on the base substrate at intersection points between the plurality of gate lines and data lines and functioning as switching elements. The upper substrate 101 includes a base substrate, and a black matrix (BM) layer, a color filter layer, and a common electrode on an inner surface of the base substrate.

The first polarizing plate 105 and the second polarizing plate 104 are respectively attached on the lower substrate 102 and the upper substrate 101 such that an optical transmission axis of the first polarizing plate 105 is at a right angle to that of the second polarizing plate 104.

The arrangement of the first and second polarizing plates 105 and 104 is employed to transmit or shield light provided from the backlight assembly 106.

However, in the transmission type LCD of the related art, it is difficult to realize slimness and lightweight of the LCD due to a large volume and a heavy weight of the backlight assembly 106. Also, there is a problem that a power consumption of the backlight assembly 106 is excessively increased.

Therefore, researches for a reflection type LCD using ambient light instead of the backlight assembly 106, are actively performed. Due to its low power consumption capability, such a reflection type LCD is widely used as a portable display device such as an electronic organizer and a PDA (Personal Digital Assistant).

FIG. 2 is a cross-sectional view schematically showing a structure of the reflection type LCD according to the related art.

Referring to FIG. 2, the reflection type LCD includes: a lower substrate 202; an upper substrate 201 which faces the lower substrate 202; a liquid crystal layer 203 including liquid crystal molecules interposed between the upper and the lower substrates 201 and 202; a first polarizing plate 205 disposed on an outer surface of the lower substrate 202; a second polarizing plate 204 disposed on an outer surface of the upper substrate 201; and a reflector 206 arranged outside the first polarizing plate 205.

The lower substrate 202 includes a lower base substrate, a plurality of gate lines and data lines arranged in a matrix configuration on the lower base substrate, and a plurality of thin film transistors (TFTs) disposed on the lower base substrate at intersection points between the plurality of gate lines and data lines and functioning as switching elements. The upper substrate 201 includes an upper base substrate, and a black matrix (BM) layer, a color filter layer, and a common electrode on an inner surface of the upper base substrate.

In the reflection type LCD, an electric field applied to the liquid crystal molecules having dielectric anisotropy is controlled to transmit or block ambient light reflected by the reflector 206, thereby displaying an image.

However, in the related art reflection type LCD, when ambient light does not have a sufficient intensity (for example, the surrounding is dim), brightness level of a displayed image is lowered and the displayed information is not readable, which is problematic.

FIG. 3 is a cross-sectional view schematically showing a construction of a transflective LCD according to the related art.

Referring to FIG. 3, the transflective LCD includes: an upper substrate 311 having an upper common electrode 312 and a color filter layer formed on a first base substrate 305; a lower substrate 332, i.e., array substrate, facing the upper substrate 311 and spaced apart by a predetermined interval from the upper substrate 311; a liquid crystal layer 320 interposed between the upper substrate 311 and the lower substrate 332; and a backlight assembly 340 disposed below the lower substrate 332, for providing light toward the lower substrate 332.

On outer surfaces of the upper substrate 311 and the lower substrate 332, i.e., on an upper surface of the upper substrate 311 and on a lower surface of the lower substrate 332, upper and lower polarizing plates 313 and 336 for converting natural light into linearly polarized light by transmitting only the light parallel to their optical transmission axes are disposed.

The optical transmission axis of the upper polarizing plate 313 is at a right angle to that of the lower polarizing plate 336.

On the base substrate 305, the color filter layer (not shown) transmitting only the light having a specific wavelength, and the upper common electrode 312 that is one of two electrodes for forming an electric field are formed.

On a second base 300 of the lower substrate 332, at least one lower pixel electrode 333 that is the other electrode for forming the electric field, a passivation layer 334 having a transmission hole 331 exposing a portion of the pixel electrode, and a reflector 335 are sequentially formed.

Also, TFTs, gate lines and data lines are formed on the base substrate 300 so as to apply a predetermined voltage to the corresponding pixel electrode 333.

At this time, a region corresponding to the reflector 335 is a reflection part 'r' and a region corresponding to the portion of the pixel electrode, exposed by the transmission hole 331, is a transmission part 't'. Also, '$d_1$' is a cell gap for the transmission mode and '$d_2$' is a cell gap for the reflection mode.

In the above reflection type LCD, a phase difference δ of the liquid crystal layer 320 is obtained by the following formula:

$$\delta = \Delta n \cdot d$$

where δ: phase difference of liquid crystal, Δn: refractive index of liquid crystal, d: cell gap.

Thus, the phase difference is controllable by the refractive index of the liquid crystal and cell gap. To reduce a difference in optical efficiency between the reflection mode by the reflection part 'r' and the transmission mode by the transmission part 't', it is required to realize a similar phase difference between the two modes.

In the transmission mode, light passes through the LCD panel once, but in the reflection mode, light passes through the LCD panel twice. Accordingly, a real effective cell gap in the reflection mode is two times greater than that in the transmission mode, so that the reflection mode has a phase difference two times greater than that of the transmission mode. To compensate for such a difference, the reflection mode and the transmission mode have different cell gaps $d_1$ and $d_2$ in the structure.

In the related art transflective LCD, one pixel is divided into the reflection part and the transmission part. At this point, if an area ratio of the reflection part and the transmission part becomes different in one pixel, there is a problem in that optical efficiencies in the reflection mode and the transmission mode become different even if the cell gaps of the liquid crystal layer between the two modes are made different to compensate for the phase difference between the two modes.

SUMMARY OF THE INVENTION

Accordingly, the present invention is directed to a transflective LCD and fabrication method thereof that substantially obviates one or more problems due to limitations and disadvantages of the related art.

An object of the present invention is to provide a transflective LCD having a COT structure in which a delta film is formed on a lower substrate to guide a light generated from a light source in the transmission mode, thereby enhancing light transmittance.

In one aspect, the present invention provides a transflective LCD and fabrication method thereof in which although one pixel region is divided into a reflection part and a transmission part at a different area ratio, optical efficiency in the transmission mode is enhanced by a delta film, thereby reducing a difference in the optical efficiency between the reflection mode and the transmission mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a transflective LCD including: an upper substrate having a common electrode formed on a first base substrate; a lower substrate spaced apart by a predetermined interval from the upper substrate and facing the upper substrate, the lower substrate having a pixel region including a switching region, a reflection part, and a transmission part, and including a delta film, a thin film transistor layer, a color filter layer and a reflector formed on a second base substrate; a liquid crystal layer interposed between the upper substrate and the lower substrate; and a backlight assembly disposed below the lower substrate, for supplying light toward the lower substrate.

According to another aspect of the present invention, there is provided a method of fabricating a transflective LCD, the method including: forming a delta film on a substrate by depositing a first material having a first refractive index on the substrate and patterning the first material to form a first pattern and forming a second material having a second refractive index between the first patterns; defining a pixel region including a switching region, a reflection part and a transmission part, and forming a thin film transistor on the switching region; sequentially forming a color filter layer and a pixel electrode on a thin film transistor layer having the thin film transistor; and sequentially depositing a passivation layer and a reflector on the defined pixel region to form a reflection part and exposing a predetermined portion to form a transmission part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
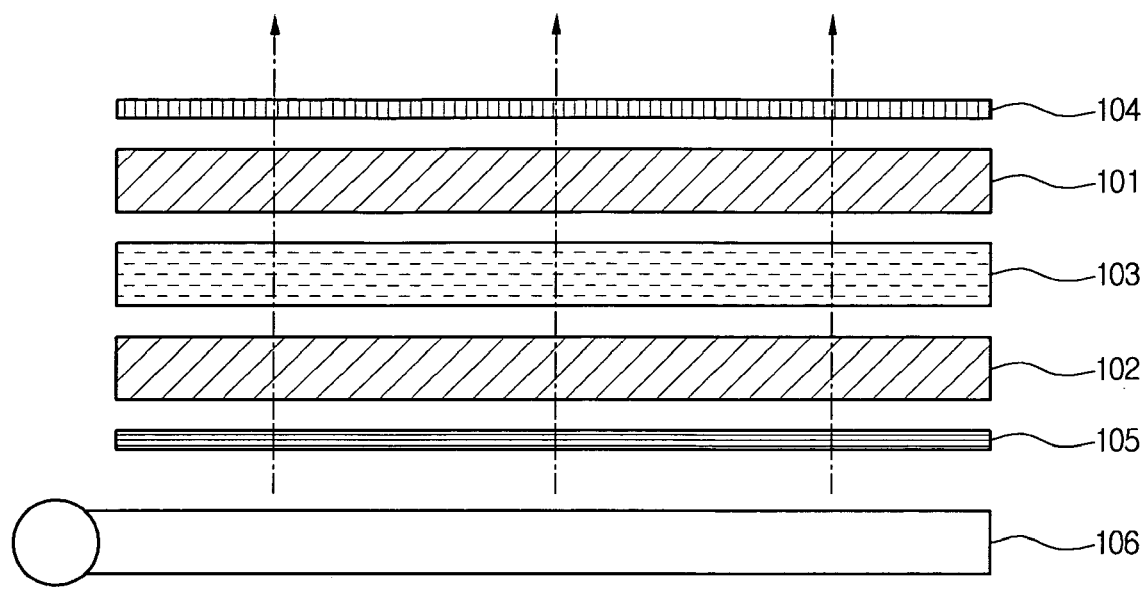
FIG. 1 is a cross-sectional view schematically showing a structure of a transmission type LCD of the related art.
Figure 2:
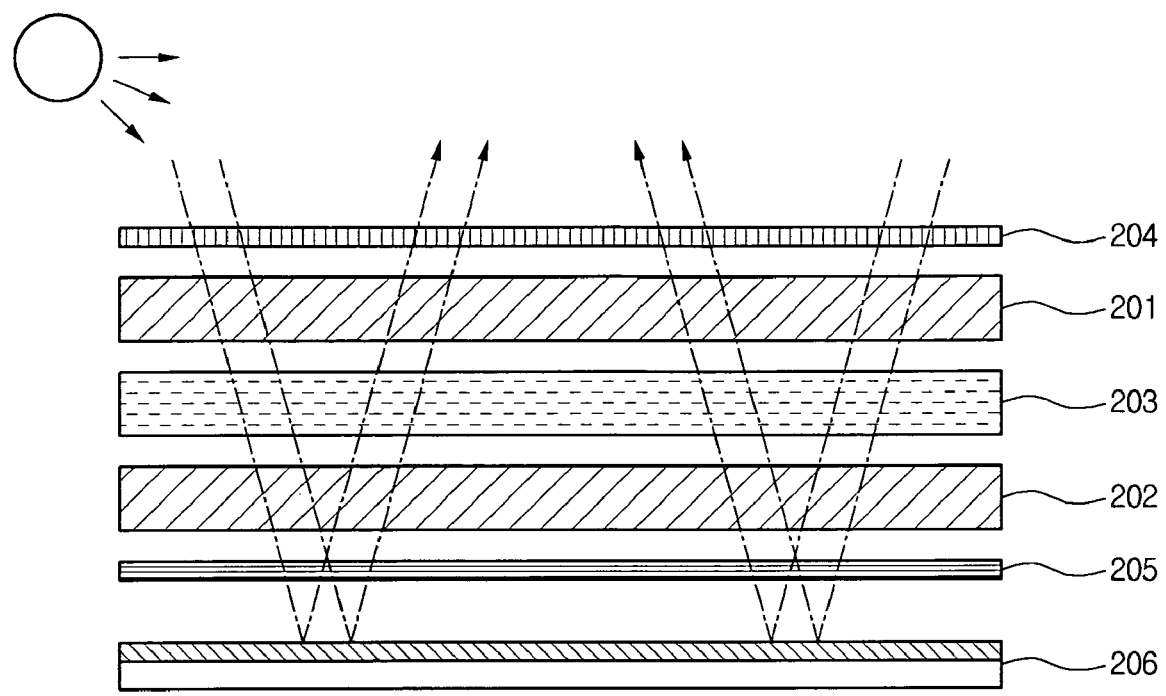
FIG. 2 is a cross-sectional view schematically showing a structure of a reflection type LCD of the related art.
Figure 3:
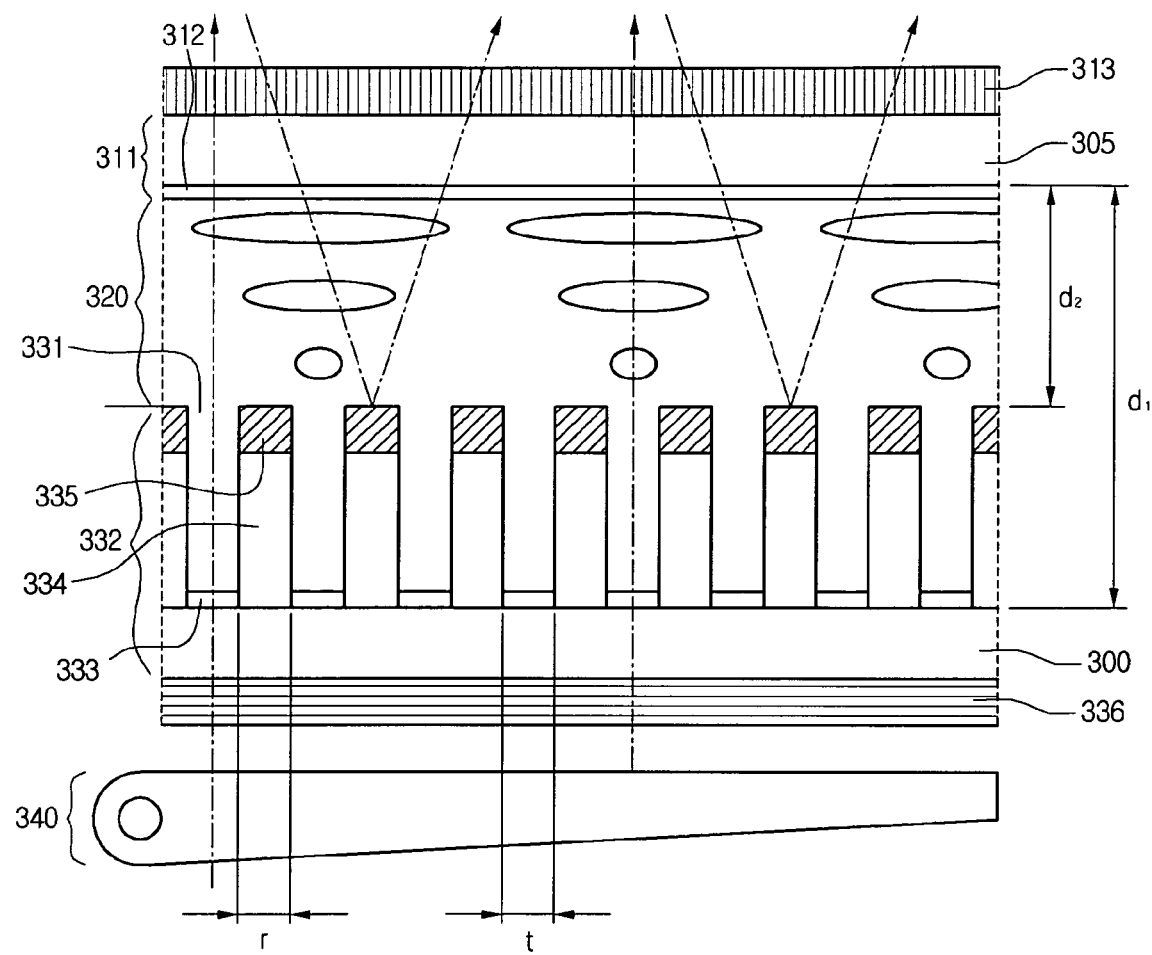
FIG. 3 is a cross-sectional view schematically showing a structure of a transflective LCD of the related art.
Figure 4:
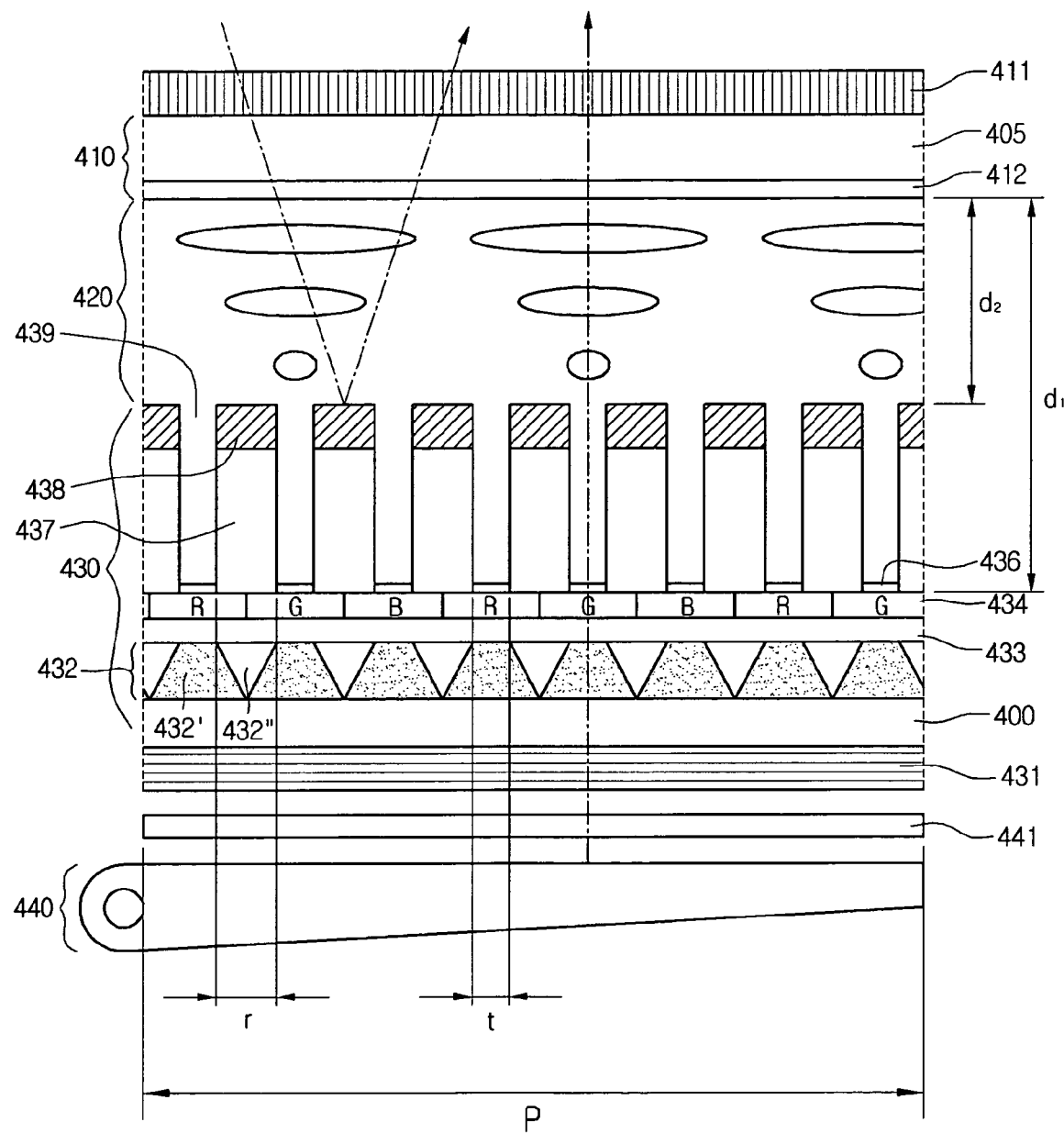
FIG. 4 is a cross-sectional view schematically showing a structure of a transflective LCD according to a first embodiment of the present invention.

FIG. 4 is a cross-sectional view schematically showing a structure of a transflective LCD according to a first embodiment of the present invention.

Referring to FIG. 4, the transflective LCD includes: an upper substrate 410 having a common electrode 412 formed on an inner surface of a first base substrate 405; a lower substrate 430 spaced apart by a predetermined interval from the upper substrate 410 and facing the upper substrate 410, the lower substrate 430 having a pixel region 'P' defined to include at least one switching region, at least one reflection part 'r', and at least one transmission part 't', and including a delta film 432, a thin film transistor layer 433, a color filter layer 434 and a reflector 438 sequentially formed on a second base substrate 400; a liquid crystal layer 420 provided between the upper substrate 410 and the lower substrate 430; and a backlight assembly 440 disposed below the lower substrate 430, for providing light. The delta film is also referred to herein as a transflective pattern layer since its pattern corresponds to the transmission parts 't' the reflection parts 'r'.

On an upper surface of the upper substrate 410 and on a lower surface of the lower substrate 430, upper and lower polarizing plates 411 and 431 for converting natural light into linearly polarized light by transmitting only the light parallel to their optical transmission axes are further disposed as part of the transflective LCD. The optical transmission axis of the upper polarizing plate 411 is at a right angle to that of the lower polarizing plate 431.

The transflective LCD further includes a collimating film 441 disposed between the lower polarizing plate 431 and the backlight assembly 440. The collimating film 441 changes an incident angle of the light emitted from the backlight assembly 440 such that a parallel light is incident on the lower substrate 430.

The common electrode 412 formed on the inner surface of the first base substrate 405 is one of two electrodes for forming an electric field applied to the liquid crystal layer 420, and is formed of a transparent conductive material.

Also, the delta film 432 formed on the second base substrate 400 functions to enhance efficiency of light passing through the transmission parts 't' defined in the pixel region P. The delta film 432 is shaped in an isosceles trapezoid pattern composed of a plurality of isosceles trapezoids connected to each other. In each trapezoid, the top part is shorter than the bottom part. The isosceles trapezoid pattern corresponds to the transmission parts 't' and the reflective parts 'r' of the pixel region 'P' as shown.

The delta film 432 is formed of an light induction medium 432' having a first refractive index and the isosceles trapezoid pattern, and of a material 432" having a second refractive index and formed between the isosceles trapezoids of the medium 432'.

At this time, the light induction medium 432' having the first refractive index is formed of a material having a refractive index greater than the material 432" having the second refractive index. That is, the first refractive index is greater than the second refractive index.

The thin film transistor layer 433 formed on the delta film 432 has a plurality of thin film transistors each including a gate electrode, a source electrode and a drain electrode. The thin film transistor layer 433 further includes an active layer and an ohmic contact layer. On the gate electrodes, a gate insulating layer is formed.

A black matrix layer (not shown), a color filter layer 434 including sequentially repeated red (R), green (G) and blue (B) color filters, and a pixel electrode 436 which is the other electrode of the two electrodes for forming an electric field applied to the liquid crystal layer, are formed on the thin film transistor layer 433. Multiple pixel electrodes 436 generally exist in the pixel region P.

At this point, each pixel electrode 436 is electrically connected with the corresponding drain electrode provided in the thin film transistor layer 433. Each pixel electrode 436 is connected with the corresponding drain electrode through a contact hole formed in an insulating layer covering the drain electrode.

Also, on the pixel electrodes 436, a passivation layer 437 and a reflector 438 are sequentially formed and patterned to define transmission holes 439 partially exposing the pixel electrodes 436.

At this time, a region corresponding to each projecting part of the reflector 438 is referred to as a reflection part 'r' and a region corresponding to each pixel electrode exposed by the transmission hole 439 is referred to as a transmission part 't'.

The liquid crystal layer 420 is interposed between the pixel electrodes 436 and the common electrode 412. When a voltage is applied to the pixel electrode(s) 436 and the common electrode 412, the liquid crystal molecules of the liquid crystal layer 420 are aligned by an electric field generated between the pixel electrode(s) 436 and the common electrode 412.

Upper and lower alignment films are respectively formed on the pixel electrodes 436 and between the common electrode 412 to determine an initial arrangement of the liquid crystal molecules.

In the meanwhile, to reduce a difference between the traveling distances of the light for the reflection part 'r' and the transmission part 't', a cell gap $d^1$ of the transmission part 't' is designed to be two times greater than a cell gap $d_2$ of the reflection part 'r'.

Specifically, a phase difference δ of the liquid crystal layer 420 is expressed by the following formula:

$$\delta = \Delta n \cdot d$$

where δ: phase difference of liquid crystal, Δn: refractive index of liquid crystal, d: cell gap.

To reduce a difference in optical efficiency between the reflection mode using light reflection and the transmission mode using light transmission, it is required to make the cell gap of the transmission part greater than the cell gap of the reflection part such that the phase difference of the liquid crystal layer is kept at a constant value. All the components of the LCD of FIG. 4 (and FIGS. 7 to 9) are operatively disposed.

In the meanwhile, like the general transmission type LCD, the transflective LCD is fabricated by a method including the steps of forming a lower array substrate having thin film transistors and pixel electrodes, forming an upper color filter substrate having a color filter layer and a common electrode, and forming an LC cell including arrangement of the two substrates, injection of a liquid crystal material, sealing, and attachment of polarizing plates.

FIGS. 5A through 5D are sectional views illustrating a method of fabricating a transflective LCD according to the first embodiment of the present invention. This method can be used to fabricate the LCD of FIG. 4.

Figure 5A:
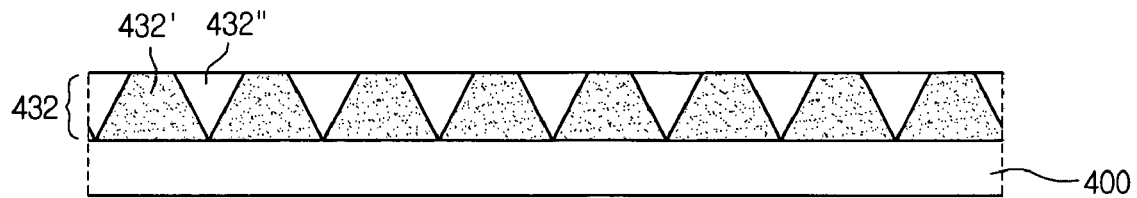
FIGS. 5A through 5D are sectional views illustrating a method of fabricating a transflective LCD according to the first embodiment of the present invention.
Figure 5B:
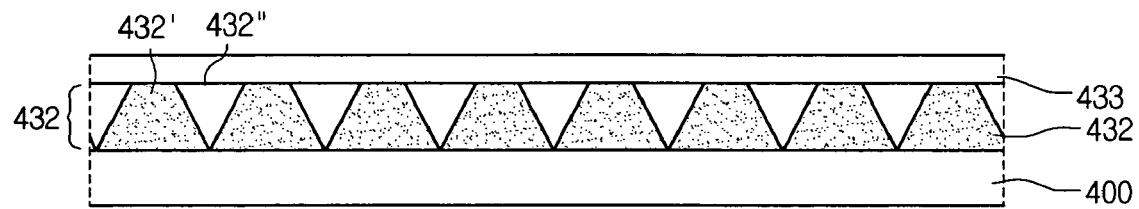

Referring to FIG. 5A, a predetermined pattern is formed with a first material 432' having a first refractive index on a substrate 400, and then a second material 432" having a second refractive index is deposited between the spaces within the predetermined pattern, thereby forming the delta film 432.

In detail, the first material 432' is deposited on the substrate 400 and is then patterned using an etching process, thereby forming the pattern of isosceles trapezoids connected to each other. At this time, each isosceles trapezoid in the pattern has a long bottom side and a short top side.

Here, the etching process can be performed using various methods. For example, in a photolithography process, a photoresist film is first coated to form a photoresist layer. Next, an exposure mask is aligned over the photoresist layer, and the exposure processing is performed to expose a specific portion (E) of the photoresist layer to light. Thereafter, the exposed photoresist is developed, and then the etching process of the patterned portions is performed depending on whether the photoresist material is a positive type or a negative type. Thereafter, the remaining photoresist layer is removed, so that the material 432' having the first refractive index is made in the pattern of the isosceles trapezoids. Next, the material 432" having the second refractive index is deposited on the substrate 400 having the first material 432' patterned in the isosceles trapezoids. At this time, the material 432' having the first refractive index is a light induction medium, and is formed of a material having a refractive index greater than the material 432" having the second refractive index such that a total internal reflection is allowed.

FIGS. 6(a)-6(d) are views illustrating a path of the total internal reflection in the delta film according to the present invention.

As shown in FIGS. 6(a)-6(d), a condition of $n_i > n_r$ should be satisfied for the total internal reflection. At this time, $n_i$ is a refractive index of the first material 432', and $n_r$ is a refractive index of the second material 432".

Also, when the condition of $\theta_r > \theta c = \arcsin(n_r/n_i)$ is satisfied, light travels while performing the total internal reflection without refraction. Herein, $\theta_r$ is a reflection angle, $\theta_c$ is a critical angle, $\theta_i$ is an incident angle for the first material 432'; and $\theta_t$ is a refraction angle for the second material 432". FIGS. 6(a)-6(d) show that the total internal reflection is achieved in FIG. 6(c).

Returning to FIG. 5B, once the delta film 432 is formed, a pixel region 'P' including switching region(s), reflection part(s) 'r' and transmission part(s) 't' are defined on the delta film 432. The switching regions are formed in the thin film transistor layer 433.

In more detail, as a switching region, a gate line, a gate electrode, a gate insulating film, an active layer, an ohmic contact layer, source and drain electrodes, a data line, and a passivation film are formed on the substrate having the delta film 432, thereby forming a thin film transistor (TFT). The LCD has the data and gate lines in a matrix configuration such that the thin film transistor is formed at each intersection of the corresponding gate line and the corresponding data line to form the thin film transistor layer 433 having the TFTs.

Figure 5C:
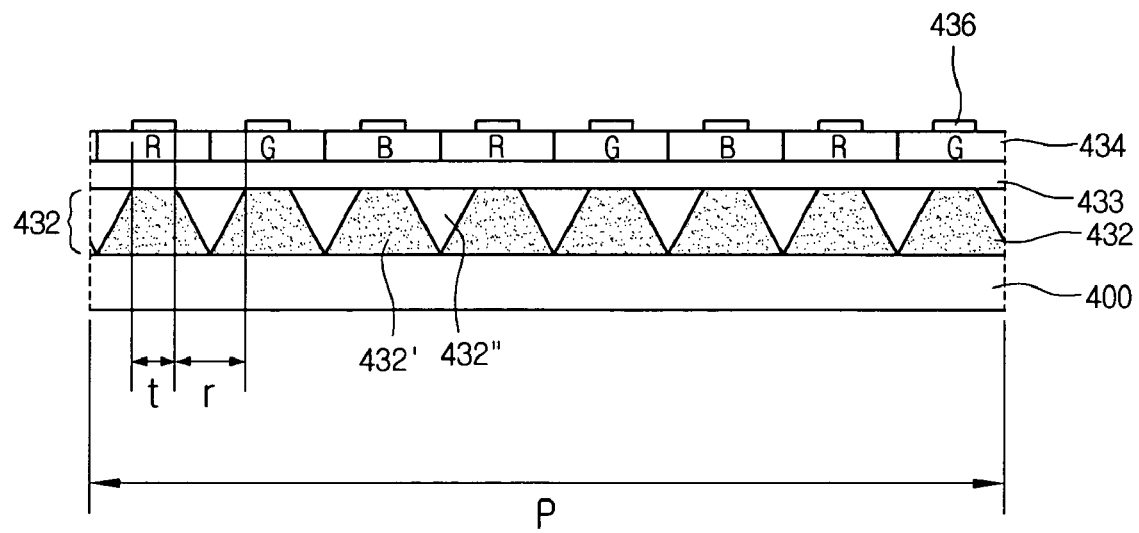

Next, as shown in FIG. 5C, a black matrix layer (not shown), a color filter layer 434 including red (R), green (G) and blue (B) color filters sequentially repeated, pixel electrodes 436 (the other of the two electrodes for forming an electric field applied to the liquid crystal) are sequentially formed on the thin film transistor layer 433.

Here, as known, each pixel electrode 436 is electrically connected with the drain electrode of the corresponding TFT provided in the thin film transistor layer 433. At this time, the drain electrode is connected to the pixel electrode 436 by exposing the drain electrode through a corresponding contact hole.

Figure 5D:
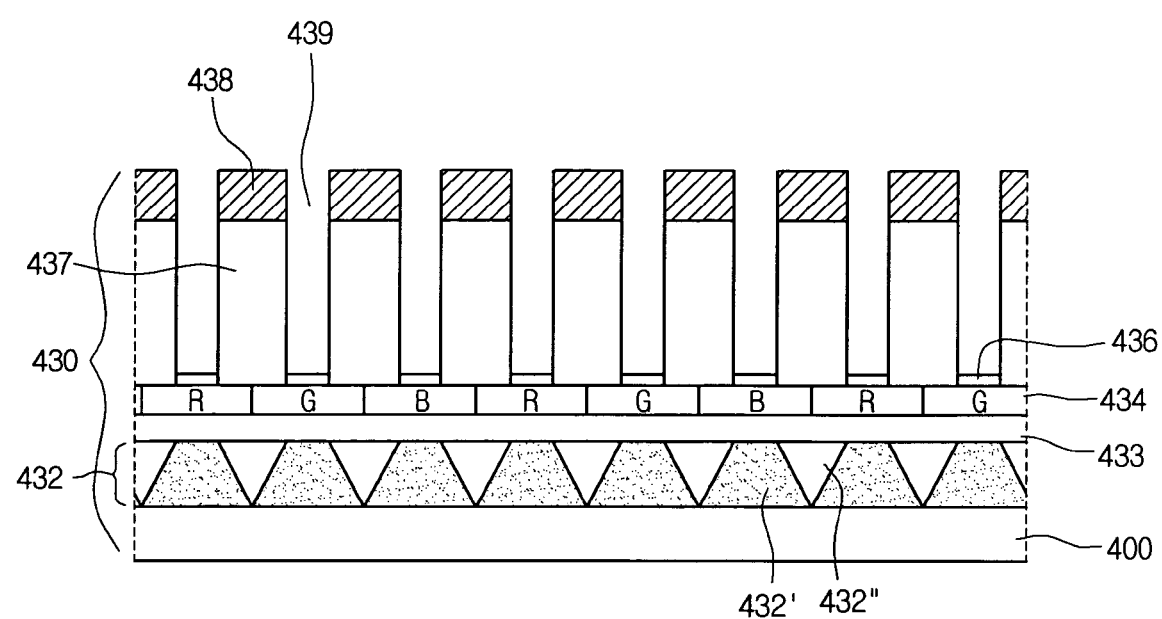
Figure 6A:
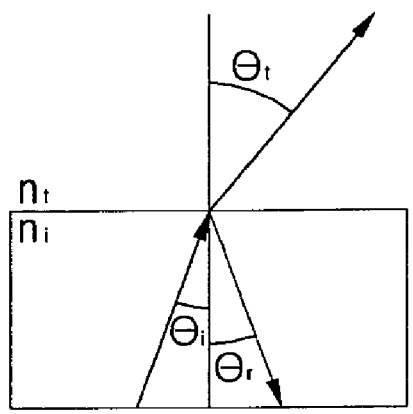
FIGS. 6(a) through 6(d) are schematic views illustrating total internal reflection paths in a delta film according to the present invention.
Figure 6B:
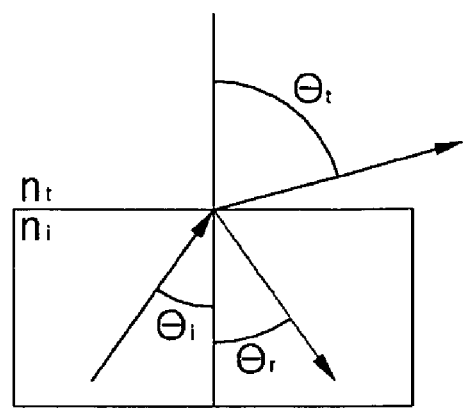
Figure 6C:
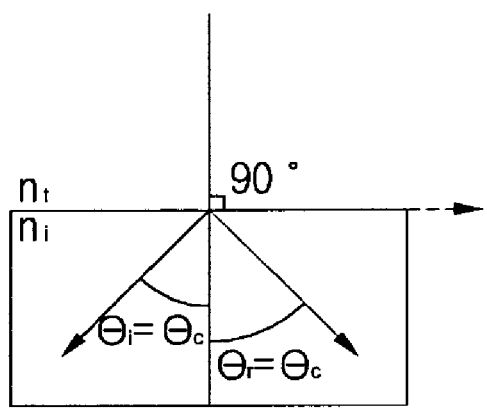
Figure 6D:
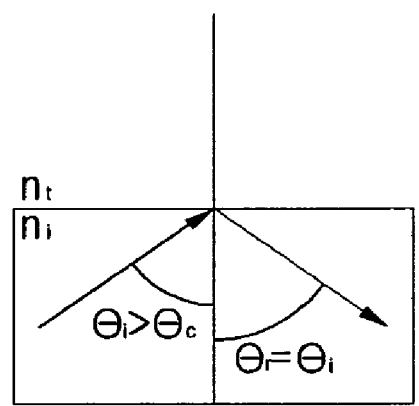

After that, as shown in FIG. 5D, a passivation layer 437 and a reflector 438 are sequentially deposited in the pixel region (P) on the resultant structure of the substrate and then patterned to form the reflector 438 used in the reflection mode. The reflector 438 (and the passivation layer 437) as patterned correspond to the reflection parts 'r'. The reflector 438 as patterned exposes the pixel electrodes 436 via transmission holes 439. The light from the backlight assembly 440 is transmitted through the pixel electrodes 436 and the transmission holes 439 in the transmission mode. This completes the formation of the lower substrate 430 of the transflective LCD according to the first embodiment of the present invention. The fabrication of the upper substrate 410 and the LC layer 420 and other known layers are performed using existing techniques.

Thus, the delta film 432 satisfying the above condition is primarily formed on the substrate 400 of the transflective LCD having the COT structure to guide light generated from the backlight assembly in the transmission mode, thereby improving the light transmittance significantly.

Figure 7:
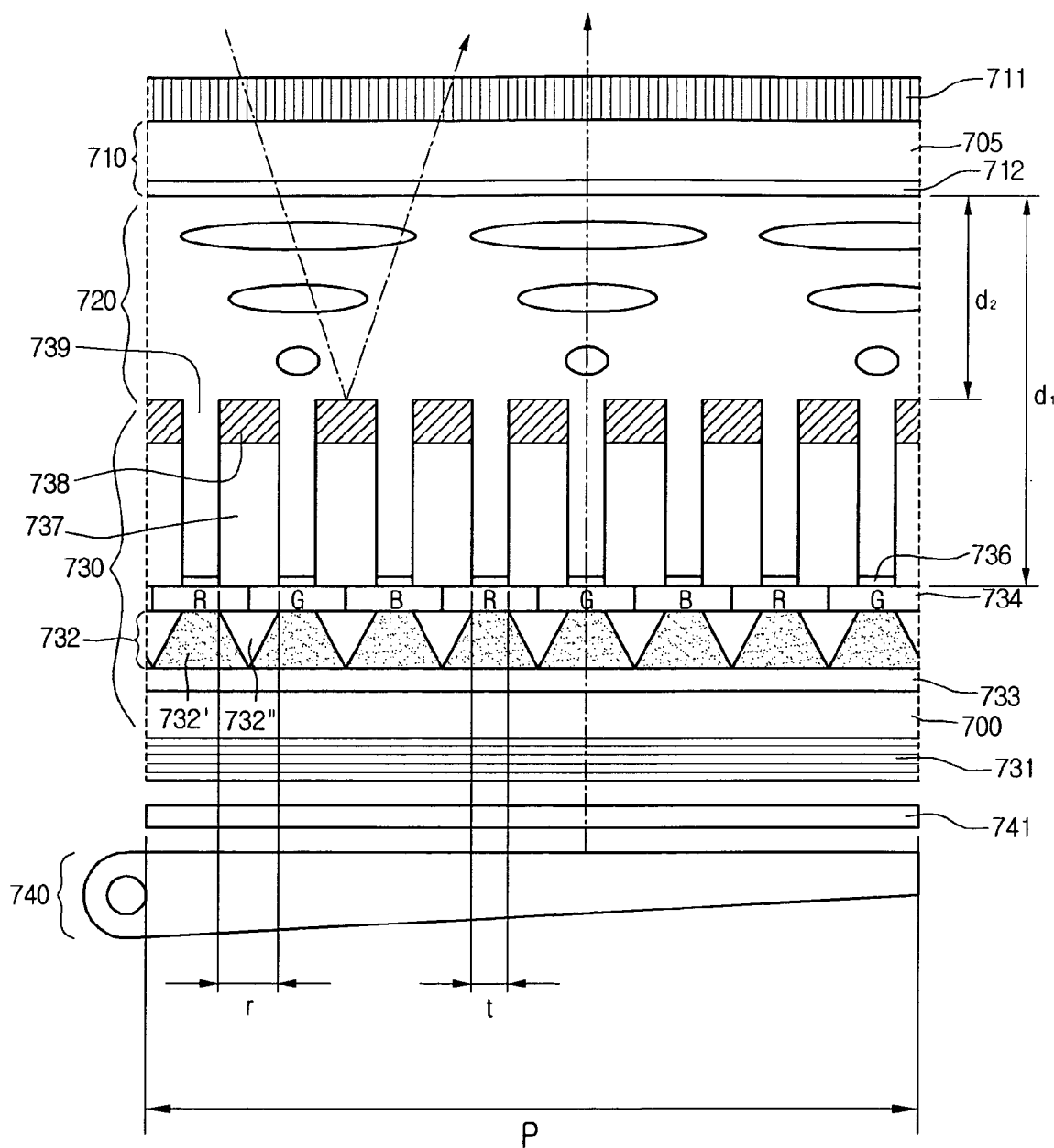
FIG. 7 is a cross-sectional view schematically showing a structure of a transflective LCD according to a second embodiment of the present invention.

FIG. 7 is a cross-sectional view schematically showing a structure of a transflective LCD according to a second embodiment of the present invention.

The transflective LCD of the second embodiment provides a thin film transistor layer 733 formed directly on a second base substrate 700 in a lower substrate 730.

Referring to FIG. 7, the transflective LCD includes: an upper substrate 710 having a common electrode 712 formed on an inner surface of a first base substrate 705; a lower substrate 730 spaced apart by a predetermined interval from the upper substrate 710 and facing the upper substrate 710, the lower substrate 730 having a pixel region 'P' defined to include switching regions, reflection parts 'r', and transmission parts 't', and including the thin film transistor layer 733, a delta film 732, and a color filter layer 734 sequentially formed on the second base substrate 700; a liquid crystal layer 720 filled between the upper substrate 710 and the lower substrate 730; and a backlight assembly 740 disposed below the lower substrate 730, for providing light.

As in the first embodiment, a collimating film 741 is further disposed between a lower polarizing plate 731 and the backlight assembly 740. The collimating film 741 changes an incident angle of the light emitted from the backlight assembly 740 such that a parallel light is incident on the lower substrate 730.

The LCD of FIG. 7 further includes the polarizing plates 731 and 711, pixel electrodes 736, a passivation layer 737, and a reflector 738 exposing the pixel electrodes 736 through transmission holes 739.

The second embodiment is identical to the first embodiment, except that the TFT layer 733 is disposed between the delta film 732 and the base substrate 700, instead of being between the delta film and the color filter layer. As such, a further detailed description of the same elements of the second embodiment will be omitted, except for as provided below.

Particularly, in the second embodiment, the delta film 732 is formed over the second base substrate 700 after the thin film transistor layer 733 is first formed on the base substrate 700. The delta film 732 has a pattern of isosceles trapezoids connected to each other. The isosceles trapezoid pattern corresponds to the transmission parts 't' of the pixel region P. The delta film 732 is composed of a light induction medium 732' having a first refractive index, and a material 732" having a second refractive index and formed between the isosceles trapezoids of the medium 732' pattern. At this time, the light induction medium 732' having the first refractive index is formed of a material having a refractive index greater than the material 732" having the second refractive index.

FIGS. 8A through 8D are sectional views illustrating a method of fabricating a transflective LCD according to the second embodiment of the present invention. This method can be used to fabricate the LCD of FIG. 7.

The description of the second embodiment will be brief because it can be understood with reference to the first embodiment of FIGS. 5A through 5D.

Figure 8A:
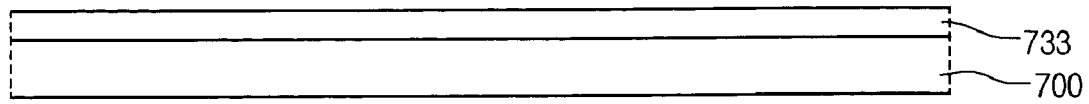
FIGS. 8A through 8D are sectional views illustrating a method of fabricating a transflective LCD according to the second embodiment of the present invention.

Referring to FIG. 8A, a thin film transistor layer 733 defining a pixel region including switching regions, reflection parts 'r' and transmission parts 't' is formed on a base substrate 700.

Figure 8B:
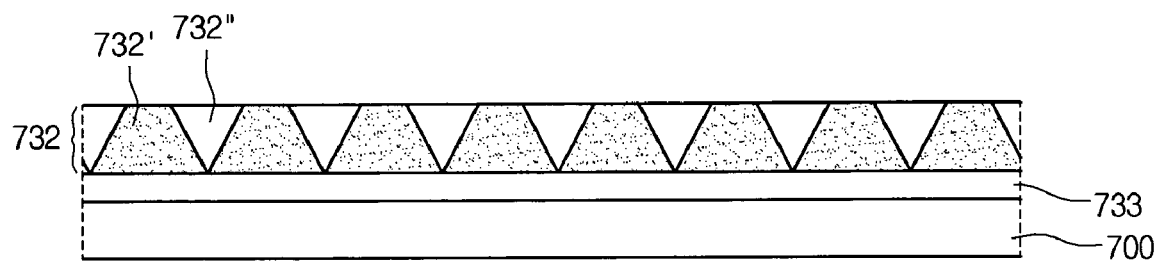

Next, referring to FIG. 8B, a first material 732' having a first refractive index is deposited and patterned on the thin film transistor layer 733 to form a predetermined pattern, and then a second material 732" having a second refractive index is deposited between the predetermined patterns, thereby forming a delta film 732.

Figure 8C:
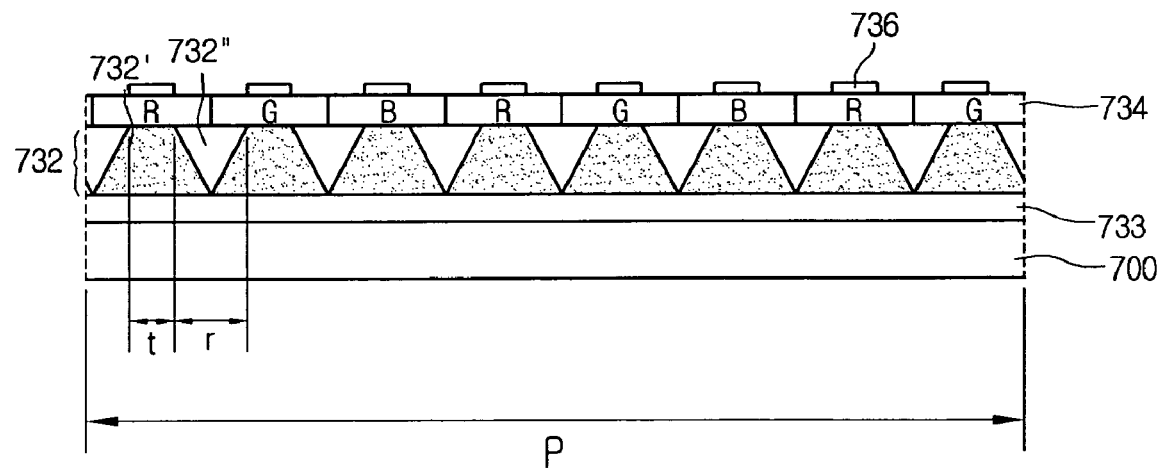

Next, referring to FIG. 8C, a color filter layer 734 and pixel electrodes 736 are sequentially formed on the delta film 732.

In more detail, a black matrix layer (not shown), a color filter layer 734 including red (R), green (G) and blue (B) color filters sequentially repeated, the pixel electrodes 736 are formed on the substrate including the delta film 732.

Figure 8D:
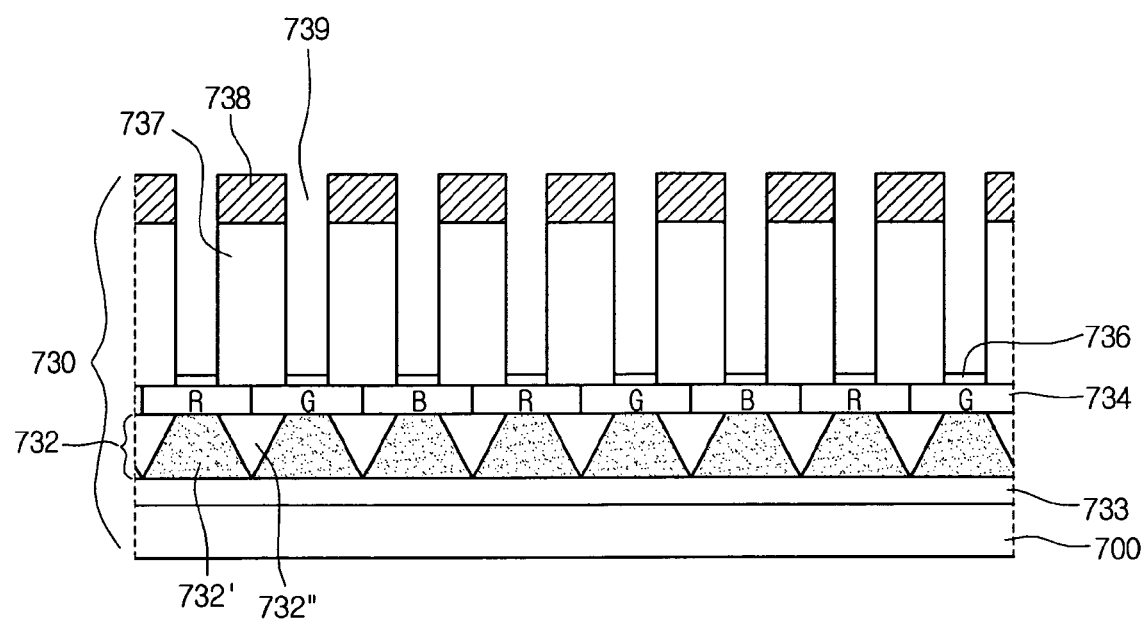

Next, referring to FIG. 8D, a passivation layer 737 and a reflector 738 are sequentially deposited in the defined pixel region P, and patterned to correspond to the reflective parts 'r' and transmission parts 't' having transmission holes 739.

Thus, the delta film 732 satisfying the above condition is formed in the lower substrate 730 of the transflective LCD to guide light generated from the backlight assembly in the transmission mode, thereby improving the light transmittance significantly.

Figure 9:
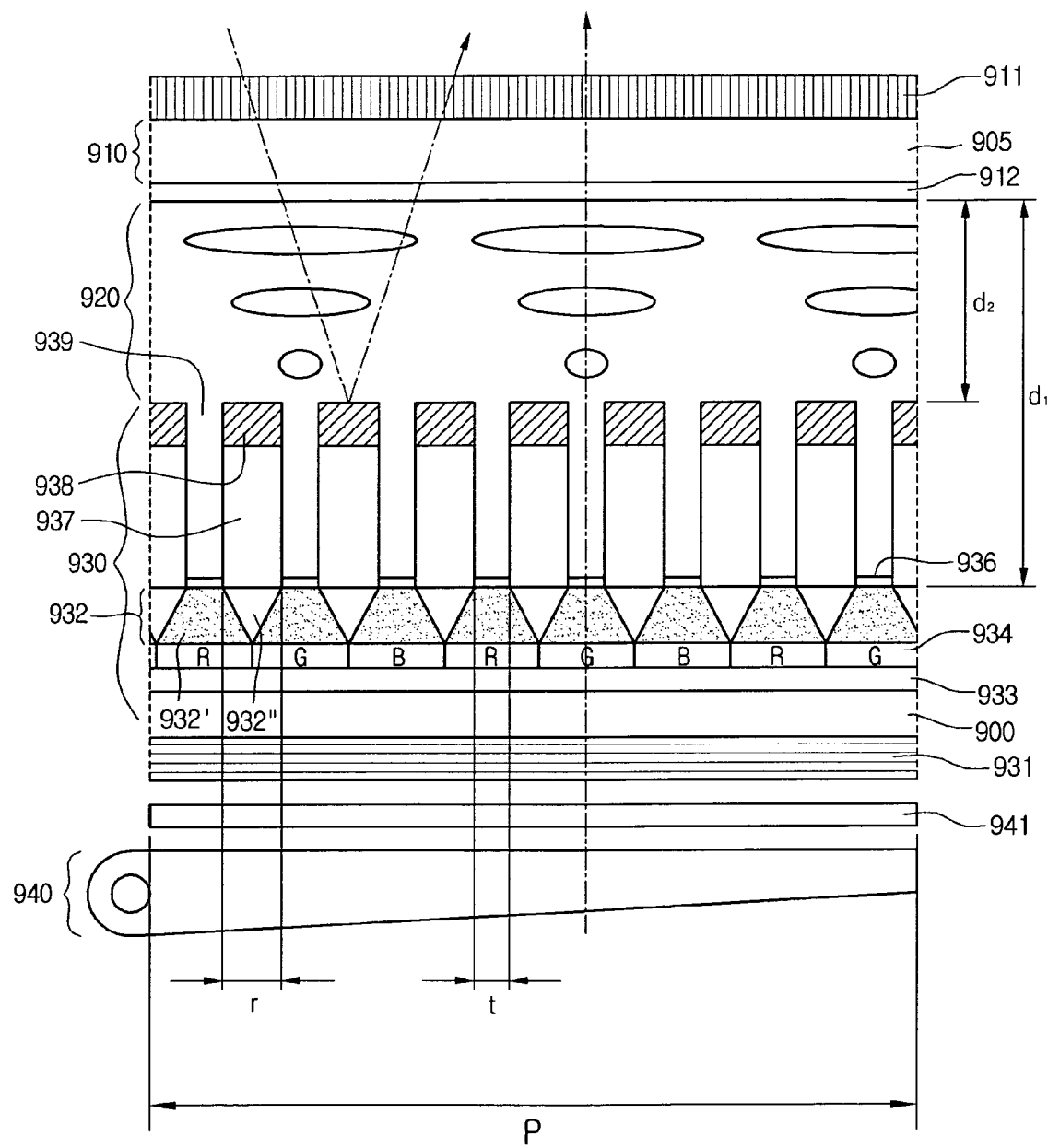
FIG. 9 is a cross-sectional view schematically showing a structure of a transflective LCD according to a third embodiment of the present invention.

FIG. 9 is a cross-sectional view schematically showing a structure of a transflective LCD according to a third embodiment of the present invention. The third embodiment is identical to the second embodiment, except that a color filter layer 934 is disposed between a delta film 932 and a TFT layer 933. As a result, the description thereof will be brief.

Referring to FIG. 9, the transflective LCD includes: an upper substrate 910 having a common electrode 912 formed on an inner surface of a first base substrate 905; a lower substrate 930 spaced apart by a predetermined interval from the upper substrate 910 and facing the upper substrate 910, the lower substrate 930 having a pixel region P defined to include switching regions, reflection parts 'r', and transmission parts 't', and including the thin film transistor layer 933, the color filter layer 934, and the delta film 932 sequentially formed on a second base substrate 900; a liquid crystal layer 920 filled between the upper substrate 910 and the lower substrate 930; and a backlight assembly 940 disposed below the lower substrate 930, for providing light.

A collimating film 941 is further disposed between a lower polarizing plate 931 and the backlight assembly 940. The collimating film 941 changes an incident angle of the light emitted from the backlight assembly 940 such that a parallel light is incident on the lower substrate 930.

The LCD of the third embodiment further includes the polarizing plates 911 and 931, pixel electrodes 936, a passivation layer 937, a reflector 938 exposing the pixel electrodes 936 via transmission holes 939. The delta film 932 has a light induction material 932' having a first refractive index and a pattern, and a material 932" having a second refractive index and formed between isosceles trapezoids of the medium 932". The first refractive index is greater than the second refractive index.

FIGS. 10A through 10D are sectional views illustrating a method of fabricating a transflective LCD according to the third embodiment of the present invention. This method can be used to fabricate the LCD of FIG. 9.

A detailed description of the third embodiment will be brief because it can be understood with reference to the first/second embodiment of FIGS. 5A-5D and 8A-8D.

Figure 10A:
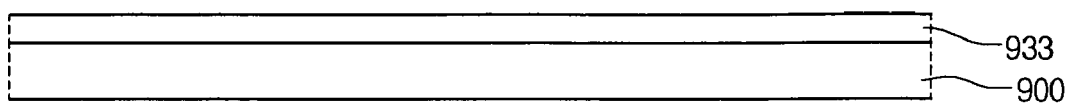
FIGS. 10A through 10D are sectional views illustrating a method of fabricating a transflective LCD according to the third embodiment of the present invention.

First, referring to FIG. 10A, a pixel region P including switching regions, reflection parts 'r' and transmission parts 't' is defined and then a thin film transistor layer 933 is formed on a second base substrate 900.

Figure 10B:
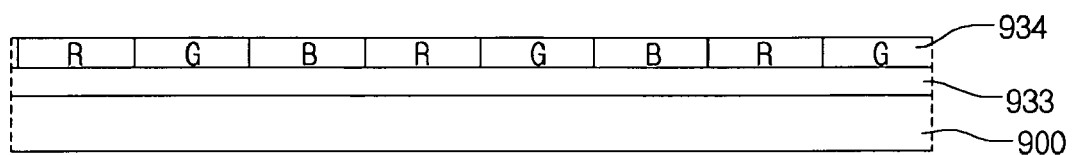

Next, referring to FIG. 10B, a color filter layer 934 is formed on the thin film transistor layer 933.

Figure 10C:
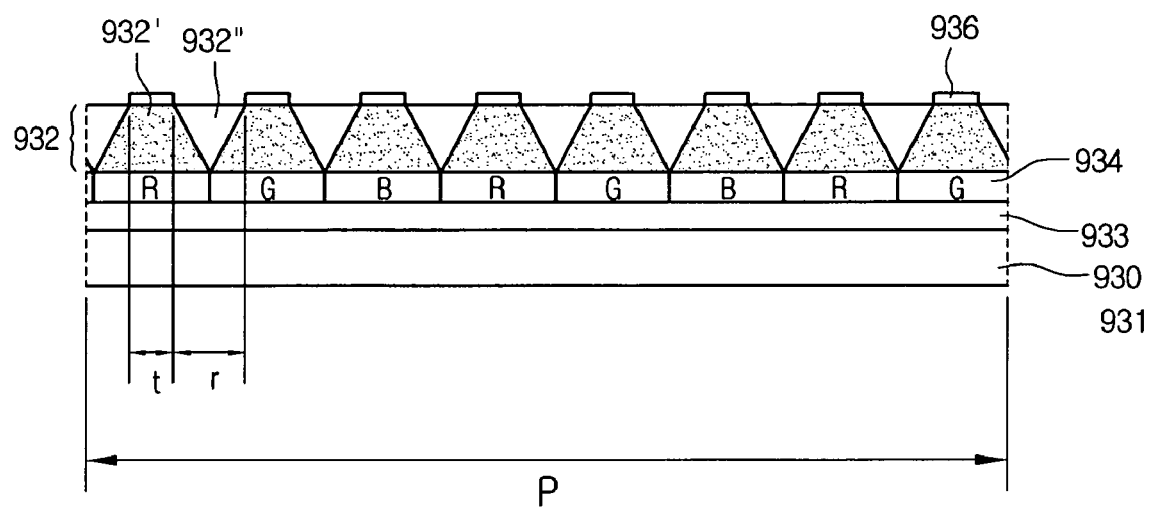

Next, referring to FIG. 10C, a first material 932' having a first refractive index is deposited on the color filter layer 934 and patterned to form a predetermined pattern, and then a second material 932" having a second refractive index is deposited between the predetermined patterns of the first material 932', thereby forming a delta film 932.

Next, pixel electrodes 936 are formed on the delta film 932. Each pixel electrode 936 is electrically connected with the drain electrode of the corresponding thin film transistor formed in the thin film transistor layer 933 through a contact hole.

Figure 10D:
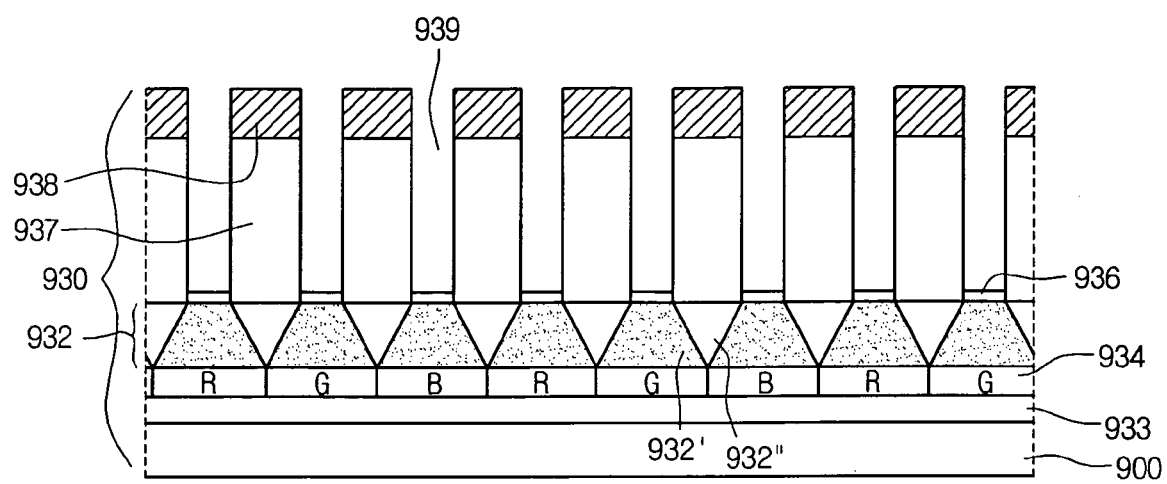

Next, referring to FIG. 10D, a passivation layer 937 and a reflector 938 are sequentially deposited in the defined pixel region P, and patterned to correspond to the reflective parts 'r' and transmission parts 't' with transmission holes 939.

Although the isosceles trapezoid pattern has been discussed for the delta film, the invention covers other patterns/shapes for the delta film. Any pattern of which a top side length corresponding to a width of a light-emission part is shorter than a bottom side length corresponding to a width of a light-incident part may be used.

As described above, in the transflective LCD of the present invention, a delta film of a light induction medium is formed inside the transflective LCD having a COT structure to guide a light generated from the backlight assembly in the transmission mode, thereby enhancing the light transmittance significantly.

Also, although one pixel region is divided into the reflection part(s) and the transmission part(s) at a different area ratio, the delta film enhances optical efficiency in the transmission mode, thereby reducing a difference in the optical efficiency between the reflection mode and the transmission mode.

It will be apparent to those skilled in the art that various modifications and variations can be made in the present invention. Thus, it is intended that the present invention covers the modifications and variations of this invention provided they come within the scope of the appended claims and their equivalents.

What is claimed is:
1. A transflective LCD comprising:
an upper substrate having a common electrode;

a lower substrate spaced apart by a predetermined interval from the upper substrate and facing the upper substrate, the lower substrate including a pixel region having a switching region, a reflection part, and a transmission part, and further including a delta film, a thin film transistor layer, a color filter layer and a reflector;

a liquid crystal layer interposed between the upper substrate and the lower substrate; and a backlight assembly disposed below the lower substrate, for supplying light toward the lower substrate, wherein the delta film, the thin film transistor layer, the color filter layer and the reflector are sequentially formed on a base substrate.

2. The transflective LCD according to claim 1, wherein the delta film has a pattern of which a top side length corresponding to a width of a light-emission part is shorter than a bottom side length corresponding to a width of a light-incident part.

3. The transflective LCD according to claim 1, wherein the delta film has a pattern formed corresponding to the transmission part of the pixel region.

4. The transflective LCD according to claim 3, wherein the delta film is composed of a light induction medium having a first refractive index, and a material having a second refractive index.

5. The transflective LCD according to claim 4, wherein the first refractive index is greater than the second refractive index.

6. The transflective LCD according to claim 1, wherein the thin film transistor layer has thin film transistors coupled to gate lines and data lines.

7. The transflective LCD according to claim 1, wherein the reflector has a pattern corresponding to the reflection part of the defined pixel region.

8. The transflective LCD according to claim 1, further comprising:

an upper polarizing plate disposed on an outer surface of the upper substrate;

a lower polarizing plate disposed on an outer surface of the lower substrate; and a collimating film disposed between the lower polarizing plate and the backlight assembly.

9. A structure of a display device, comprising:

a transflective pattern layer, a thin film transistor (TFT) layer, and a color filter layer on a base substrate and arranged in a predetermined order, wherein the transflective pattern layer includes first parts associated with a transmission mode of the display device and second parts associated with a reflection mode of the display device, wherein the predetermined order is the transflective pattern layer, the TFT layer and then the color filter layer.

10. The structure according to claim 9, wherein the first parts have a refractive index greater than a refractive index of the second parts.

11. The structure according to claim 10, wherein the first parts have a pattern of trapezoids.

* * * * *